(12) United States Patent  
Lipscombe

(10) Patent No.: US 9,402,295 B2
(45) Date of Patent: Jul. 26, 2016

(54) ACCENT LIGHTING SYSTEM

(71) Applicant: Method Lights, LLC, Knoxville, TN (US)

(72) Inventor: Bruce Lipscombe, Knoxville, TN (US)

(73) Assignee: Method Lights, LLC, Knoxville, TN (US)

( * ) Notice: Subject to any disclaimer, the term of this patent is extended or adjusted under 35 U.S.C. 154(b) by 0 days.

(21) Appl. No.: 14/598,660

(22) Filed: Jan. 16, 2015

(65) Prior Publication Data

US 2015/0208491 A1 Jul. 23, 2015

Related U.S. Application Data

(60) Provisional application No. 61/929,057, filed on Jan. 18, 2014.

(51) Int. Cl.
```
H01J 5/48      (2006.01)
H05B 37/02     (2006.01)
H05B 33/08     (2006.01)
```
(52) U.S. Cl.
CPC ........ *H05B 37/0272* (2013.01); *H05B 33/0863* (2013.01); *Y02B 20/346* (2013.01)

(58) Field of Classification Search
CPC ........... H05B 37/0281; H05B 33/0803; H05B 33/0815; H05B 33/0842; H05B 33/0845; H05B 37/0272; F21S 2/005
See application file for complete search history.

(56) References Cited

U.S. PATENT DOCUMENTS

2013/0020955 A1* 1/2013 Igaki ................. H05B 33/0803
                                                        315/201
2015/0016088 A1* 1/2015 Shiraichi .................. F21K 9/56
                                                         362/84

\* cited by examiner

*Primary Examiner* — Douglas W Owens
*Assistant Examiner* — Monica C King
(74) *Attorney, Agent, or Firm* — Knox Patents; Thomas A. Kulaga

(57) ABSTRACT

Apparatus for illuminating an object with light that is controlled for intensity and color temperature. A ceiling mounted luminaire contains a circuit that controls the intensity and color temperature of light emitting diodes (LEDs). In one embodiment the circuit is battery powered. A remote unit provides input to the luminaire for controlling the intensity and color temperature of the emitted light. The frequency of a pulse width modulation (PWM) device is varied to control the intensity of an associated LED. The duty cycle or voltage of a pulse width modulation (PWM) device is varied to control the color temperature of an associated LED. In one embodiment a single LED with the desired color temperature range and intensity level is used. In another embodiment multiple LEDs with different color temperature ranges are controlled to provide a mixed output at the desired color temperature and intensity.

20 Claims, 5 Drawing Sheets

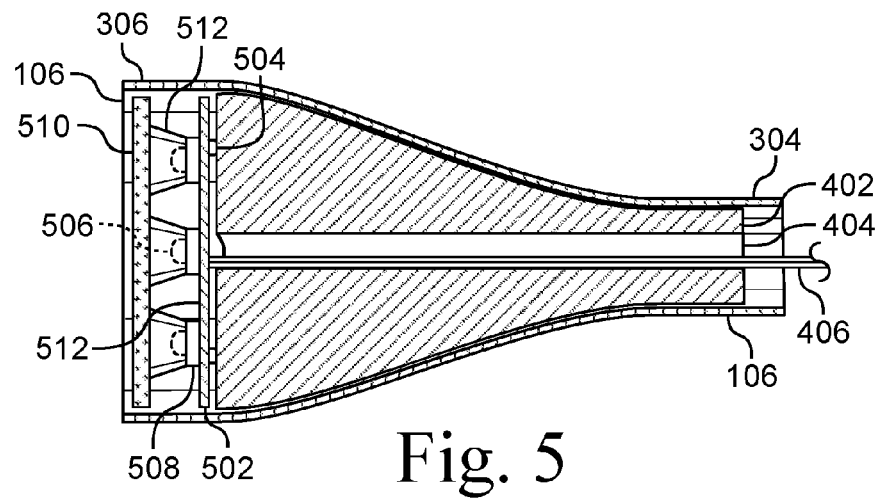
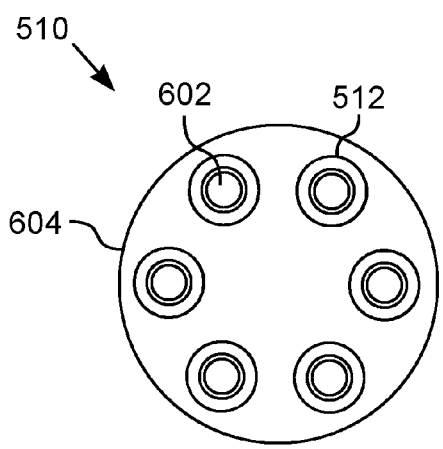 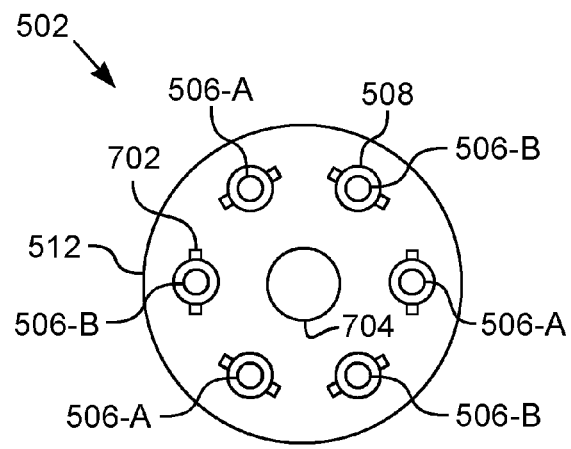
Fig. 5
Fig. 6        Fig. 7

ACCENT LIGHTING SYSTEM

CROSS-REFERENCE TO RELATED APPLICATIONS

This application claims the benefit of U.S. Provisional Application No. 61/929,057, filed Jan. 18, 2014.

STATEMENT REGARDING FEDERALLY SPONSORED RESEARCH OR DEVELOPMENT

Not Applicable

BACKGROUND

1. Field of Invention

This invention pertains to a light fixture with remote control. More particularly, this invention pertains to a light fixture in which the intensity and color temperature of the light is selected from a remote control.

2. Description of the Related Art

To be appreciated, fine art must be properly illuminated. For example, a painting hung on a wall will have a lamp positioned above the top of the painting to illuminate the artwork. The lamp can be attached to the ceiling with the light directed toward the painting. The lamp can also be mounted on the wall and suspended away from the wall with the light directed toward the painting. It is common for such lamps to use either a fluorescent or incandescent bulb to provide the illumination. These bulbs typically operate at a single color temperature. Generally fluorescent bulbs have a cold color temperature and incandescent bulbs provide a warmer or redder color temperature.

Color temperature is a characteristic of visible light that has important applications in lighting. Color temperature is commonly stated in degrees Kelvin, a unit of absolute temperature. Generally, color temperatures above 5,000 degrees K are called cool or cold colors. Such colors appear bluish-white. Lower temperatures are called warm colors and extend from yellowish-white through red. The color temperature observed visually impacts the aesthetics of various objects, such as pieces of art. It is desirable to display art objects so as to present a specific effect and such effects typically depend upon the color temperature of the illuminating light.

BRIEF SUMMARY

According to one embodiment of the present invention, a light fixture is provided. The light fixture is a luminaire that interacts with a remote control unit for projecting illumination at a selected light intensity and a selected color temperature. In this way the luminaire illuminates objects, such as a painting or other fine art work, in a manner best suited considering the characteristics of the object and the ambient lighting conditions.

The luminaire includes a power supply, a control unit, and a light source. In one embodiment the power supply is a battery system configured to last one year. In another embodiment the power supply is connected to an external power source. The control system and light source provide a selected intensity, a selected color temperature, and a selected illumination duration. The intensity of the light emitted by the luminaire is varied by changing the frequency applied to the light source, which is one or more light emitting diodes (LEDs). In various embodiments the color temperature of the light emitted by the luminaire is varied by changing the voltage and/or the duty cycle of power applied to the light source.

In various embodiments the luminaire is protected from overheating. For example, in one such embodiment the luminaire includes a thermal fuse to protect against the light source overheating. In various embodiments the thermal fuse has a trigger point between 120 and 140 degrees Fahrenheit and shuts off the light source when the temperature exceeds the trigger point.

In one embodiment the remote control unit is a hand-held unit that wirelessly controls one or more luminaires. In other embodiments the remote control unit is wall mounted with a wireless or wired connection to one or more luminaires.

Another embodiment provides for automatic color temperature adjustment. A photo sensor measures the ambient light and adjusts the intensity and/or the color temperature of the light source based on the ambient conditions. One such embodiment has the sensor measuring the temperature of the light reflected from the illuminated object. The luminaire emitted color temperature is adjusted to maintain a specified value under varying ambient conditions. In another such embodiment the luminaire emitted color temperature is adjusted to maintain a white balance.

BRIEF DESCRIPTION OF THE SEVERAL VIEWS OF THE DRAWINGS

The above-mentioned features will become more clearly understood from the following detailed description read together with the drawings in which:

FIG. 5 is a partial cross-sectional view of the lens end of one embodiment of the light tube of the luminaire.

FIG. 6 is a rear view of the lens assembly.

FIG. 7 is a front view of the light plate showing the light emitting diodes (LEDs).

DETAILED DESCRIPTION

Apparatus for illuminating an object with a specified intensity and color temperature is disclosed. Various elements are described generically below and are uniquely identified when pertinent to the discussion, for example, the light sources 506 are generally indicated as 506 with particular embodiments and variations shown in the figures and described below having a suffix, for example, 506-A, 506-B.

Figure 1:
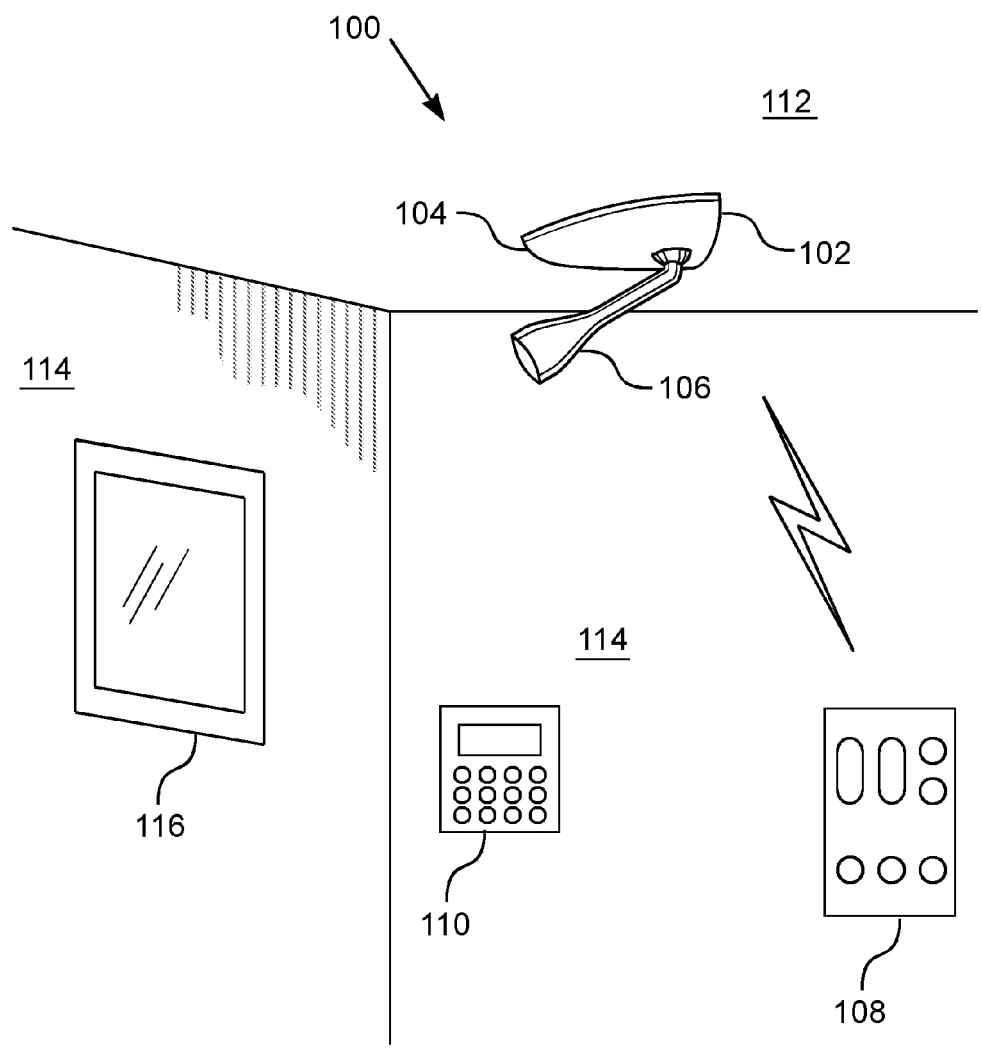
FIG. 1 is a perspective view of one embodiment of the luminaire system.

FIG. 1 illustrates a perspective view of one embodiment of the luminaire system or accent lighting system 100. The illustrated luminaire system 100 includes a luminaire 102, a first remote unit 108, and a second remote unit 110. The luminaire 102 is mounted on a ceiling 112 and includes a body or housing 104 with a protruding stalk or projector 106. The projector or light tube 106 is directed toward an object 116, such as a picture or painting mounted on a wall 114, as illustrated, or a sculpture or other piece of fine art on the floor or a pedestal.

The first remote unit 108 and the second remote unit 110 are controllers in communication with the luminaire 102. The first remote unit 108 is a handheld unit wirelessly connected to the luminaire 102. The second remote unit 110 is configured to mount on a wall 114 and is connected to the luminaire 102, in various embodiments, either wirelessly or via a wired connection, such as via a direct connection or through a network or other connection using a communications protocol. The remote units 108, 110 include features allowing zone control, that is, control of one or more luminaires 102 that define a zone with the luminaires 102 in that zone independently controlled relative to one or more luminaires 102 in another zone. For example, a room may have multiple zones depending upon window and fixed lighting placement. Each zone has luminaires 102 that illuminate one or more objects 116. The remote units 108, 110 communicate with the luminaire 102 for controlling operating characteristics of a specific luminaire 102. Those operating characteristics include the intensity, the color temperature, and the illumination duration.

In another embodiment the luminaire 102 is configured to replace an incandescent bulb in a light fixture, such as is conventionally used as accent lights. Instead of having a housing 104 mounted on the ceiling 112, the luminaire 102 has a configuration suitable for replacing the conventional bulb with the projector 106 extending from the bulb socket. In this way the projector 106 projects illumination towards the object 116 as described herein. In such an embodiment the luminaire 102 draws power from the light fixture and interacts with the remote units 108, 110 for operational control.

Figure 2:
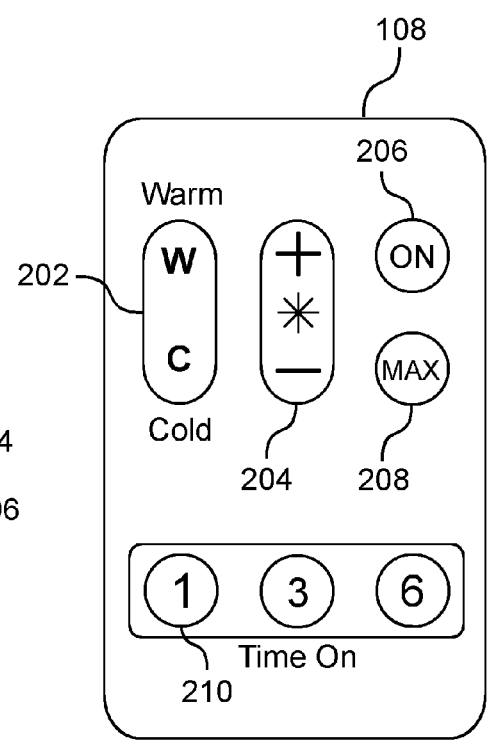
FIG. 2 is a plan view of one embodiment of a remote control unit.

FIG. 2 illustrates a plan view of one embodiment of the first remote unit 108. The remote unit 108 is a hand-held device that communicates with the luminaire 102 wirelessly. In one embodiment the remote unit 108 is matched to communicate with a single luminaire 102. In another embodiment the remote unit 108 is configured to communicate with multiple luminaires 102, such as would be encountered in a gallery or other location with multiple objects to be illuminated. The remote unit 108 selects the desired luminaire 102 with which to communicate, such as by operating a control to select the desired luminaire 102 or by aiming the remote unit 108 directly at the desired luminaire 102, such as would be required for a line-of-site infrared communications beam.

The illustrated remote unit 108 includes various operator controls. The color temperature control 202 allows for increasing and decreasing the color temperature, that is, for making the emitted light warmer or colder. The brightness control 204 allows for increasing and decreasing the intensity of the light emitted from the luminaire 102. The power control 206 allows for powering the luminaire 102 on or off. The maximum intensity control 208 allows for increasing the intensity of the light emitted from the luminaire 102 to the maximum value. The time controls 210 allow for various time delays before the luminaire 102 turns off. For example, 1, 3, or 6 hours are selectable for the luminaire 102 to remain powered on and provide illumination before automatically turning off. The second remote unit 110, in various embodiments, performs the same functions as the first remote unit 108.

In one embodiment the remote unit 108 communicates with multiple luminaires 102. For example, one remote unit 108 is configured to control three luminaires 102. The particular luminaire 102 desired to be controlled by the remote unit 108 at a particular time is selected by a long press of one of the time controls 210. In this way each of three luminaires 102 are associated with one of the three control buttons 210 and any one of the three luminaires 102 is selected for control by operating the associated button 210. In one such embodiment the luminaire 102 includes an indicator lamp that indicates the particular luminaire 102 that is selected for control by the remote unit 102. In another embodiment the remote unit 108, 110 includes a dedicated zone/luminaire selector control performs the function of selecting the luminaire 102 to be controlled by the remote unit 108, 110.

Figure 3:
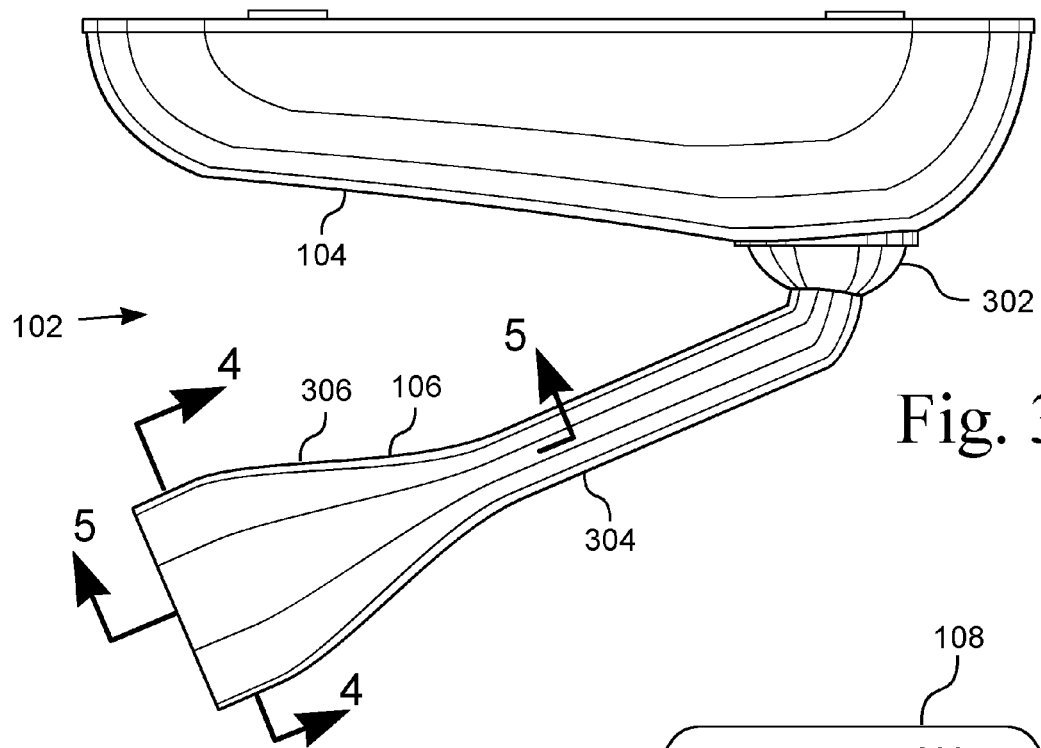
FIG. 3 is a side view of one embodiment of a luminaire.

FIG. 3 illustrates a side view of one embodiment of a luminaire 102. The illustrated luminaire 102 includes a body 104 with a projector or light tube 106 extending therefrom. The light tube 106 includes a stalk 304 and a lens end 306. The stalk 304 is substantially cylindrical and flares out into the bell-shaped lens end 306. The light tube 106 is positionable in order to aim the light source in a desired direction. The illustrated embodiment connects the light tube 106 to the body 104 with a ball joint 302 that allows the light tube 106 to move in several directions. The ball joint 302 includes a central passage that allows passage of the wiring 406 between the light tube 106 and the body 104.

In other embodiments the luminaire 102 includes the projector or light tube 106 and/or the ball joint 302. The end of the luminaire 102 opposite the lens end 306 has a connector configured to be received by a socket in a conventional accent light. The luminaire 102 replaces a conventional bulb in the conventional accent light and receives power from the accent light connection. In this way the luminaire 102 is a self-contained unit that does not require a body or base 104 to be attached to ceiling 112 or wall 114.

Figure 4:
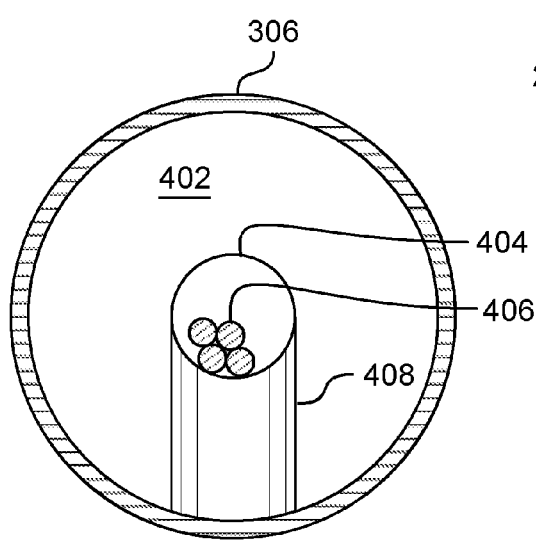
FIG. 4 is a cross-sectional view of one embodiment of a light tube showing a heat sink for the luminaire.

FIG. 4 illustrates a cross-sectional view of one embodiment of a light tube 106 showing the heat sink 402 for the luminaire 102. FIG. 5 illustrates a partial cross-sectional view of the lens end 306 of one embodiment of the light tube 106 of the luminaire 102. The light tube 106 includes a heat sink 402, a light assembly 502, and a lens assembly 510.

Under many circumstances the light source 506 generates heat that must be dissipated. In the illustrated embodiment the light tube 106 has a heat sink 402 that extends from near the lens end 306 of the light tube 106 into the stalk 304. The heat sink 402 is a material with high thermal conductivity, such as aluminum or copper, that conducts heat from the light sources 506 to the light tube 106, where the heat is transferred to the wall of the light tube 106 and then removed from the light tube 106 by thermal radiation and/or convection. The heat sink 402 in one embodiment is sized such that the outer surface of the heat sink 402 is in contact with the inner surface of the light tube 106. In another embodiment a conductive material, such as a heat conductive adhesive or a heat conductive grease, lubricant, or material is disposed between the outer surface of the heat sink 402 and the inner surface of the light tube 106.

The heat sink 402 also includes a passage 404 that permits convective air flow through the light tube 106 and into the body 104. The passage 404 is appropriately sized to accommodate the conductors 406, either individually or in a cable, without impairing the convective air flow capacity of the passage 402. The front face of the heat sink 402 includes a channel 408 that provides an air flow path into the passage 404. The channel 408 extends from the passage 404 in a direction away from the body 104 of the luminaire 102.

With the luminaire 102 mounted on the ceiling 112 and the light tube 106 aimed downward at about a 30 degree angle, convective flow occurs naturally from the heat generated by the light sources 506. When first turned on the light sources 506 generate heat that results in a localized temperature spike that then decreases to a steady state temperature. During the initial temperature spike the convective air flow is through the channel 408, into the air passage 404, into the proximal end 304 of the light tube 106, through the ball joint 302, and into the body 104 of the luminaire 102. The convective air flow aids in dissipating the heat from the initial temperature spike. In the steady state condition the conduction of heat through the heat sink 402 is sufficient to dissipate the waste heat from the light source 506, although the convective air flow through the channel 408 and passage 404 aids in keeping the temperature low. In one embodiment the body 104 and/or the light tube 106 include louvers or exhaust ports that allow the free flow of heated air through the luminaire 102, thereby enabling additional convective air flow.

At the outboard end of the heat sink 402 is a light assembly 502 that is adhered or otherwise attached to the front face of the heat sink 402 with a thermally conductive adhesive or connector 504. In the illustrated embodiment, the plate 508 of the light assembly 502 is adhered with adhesive 504 in three places such that the plate 508 is spaced apart from the front face of the heat sink 402 by approximately one millimeter. In another embodiment the plate 508 is attached to the heat sink 402 with fasteners or other connectors that allow heat transfer from the plate 508 to the heat sink 402.

Extending outward from the light assembly 502 are the light sources 506. The light sources 506 in the illustrated embodiment are light emitting diodes (LEDs) that have an encircling shoulder 508. The light sources 506 are divided between cool LEDs 506-A and warm LEDs 506-B, where cool and warm refer to the color temperature of the LEDs 506-A, 506-B. In the illustrated embodiment the LEDs 506-A, 506-B are equal in number, although in other embodiments the number of the LEDs 506-A, 506-B varies based on the desired color output of the luminaire 102 and the color temperature of the LEDs 506-A, 506-B. A lens assembly 510 is positioned between the light assembly 502 and the distal end 306 of the light tube 106. The lens assembly 510 includes spacers 512 that are equal in number to the LEDs 506. The distal end of the spacers 512 rest against the shoulders 508 of the LEDs 506. In one embodiment the inside surface of the lens end 306 of the light tube 106 is reflective. In this way any stray light from the LEDs 506 is directed out through the lens assembly 510.

FIG. 6 illustrates a rear view of the lens assembly 510. FIG. 7 illustrates a front view of the light assembly 502 showing the light emitting diodes (LEDs) 506. The lens assembly 510 includes a lens plate 604 from which spacers 512 extend. In various embodiments the lens plate 604 is a clear or translucent material that has a smooth, clear outer surface or a diffusion surface. The diffusion surface softens the light from the light sources 506.

The lens plate 604 also includes lens elements 602 that are co-planar with the lens plate 604 and coaxial with the spacers 512. The lens elements 602 focus the light from the light sources 506 to illuminate the desired object 116. For example, with the luminaire 102 mounted 6 feet from the object 116 with the light tube 106 at an approximate 30 degree angle from the plane of the ceiling 112, the lens elements 602 focus the emitted light to illuminate a 44 inch diameter slightly oval or egg-shaped area on the wall 114. In one embodiment each lens element 602 focuses the light beam from its associated LED 506 on the same spot at a selected distance, which is six feet in the above example. In other embodiments each lens element 602 has a configuration that focuses the light beam from its associated LED 506 on different spots in order to obtain an illuminated area on the wall 114 having a desired shape. In this way odd shaped objects 116 are better illuminated with more coverage.

The light assembly 502 includes a circuit board 512 with the LEDs 506-A, 506-B connected thereto. In one embodiment the circuit board 512 has an aluminum or other heat conductive substrate with insulated electrical traces on one surface. The illustrated circuit board 512 includes a central through-opening 704, which in various embodiments, allows passage of the conductors 406 and/or passage of air from the front of the circuit board 512 into the passage 404 in the heat sink 402, thereby aiding in the convective cooling of the light source 506. The LED leads 702 extend from the shoulders 508 of the LEDs 506 and are connected to the electrical traces on the circuit board 502. The conductors 406 are electrically connected to the electrical traces on the circuit board 502 and connect the LEDs 506-A, 506-B to the circuitry in the body 104 of the luminaire 102.

In the illustrated embodiment, the cool LEDs 506-A are alternated with the warm LEDs 506-B with the LEDs 506 arranged in a circular pattern. The shoulders 508 of the LEDs 506 align with the distal ends of the spacers 512 on the lens assembly 510. The shoulders 508 and spacers 512 are dimensioned to place the light emitting portion of the LEDs 506 at the focal point of the lens elements 602 such that the desired size of illuminated circle is produced on the wall 114. In various configurations the lens elements 602 shape, focus, and/or diffuse the light output. The lens elements 602 ensure that the available light output is efficiently used to illuminate the object 116.

Figure 8:
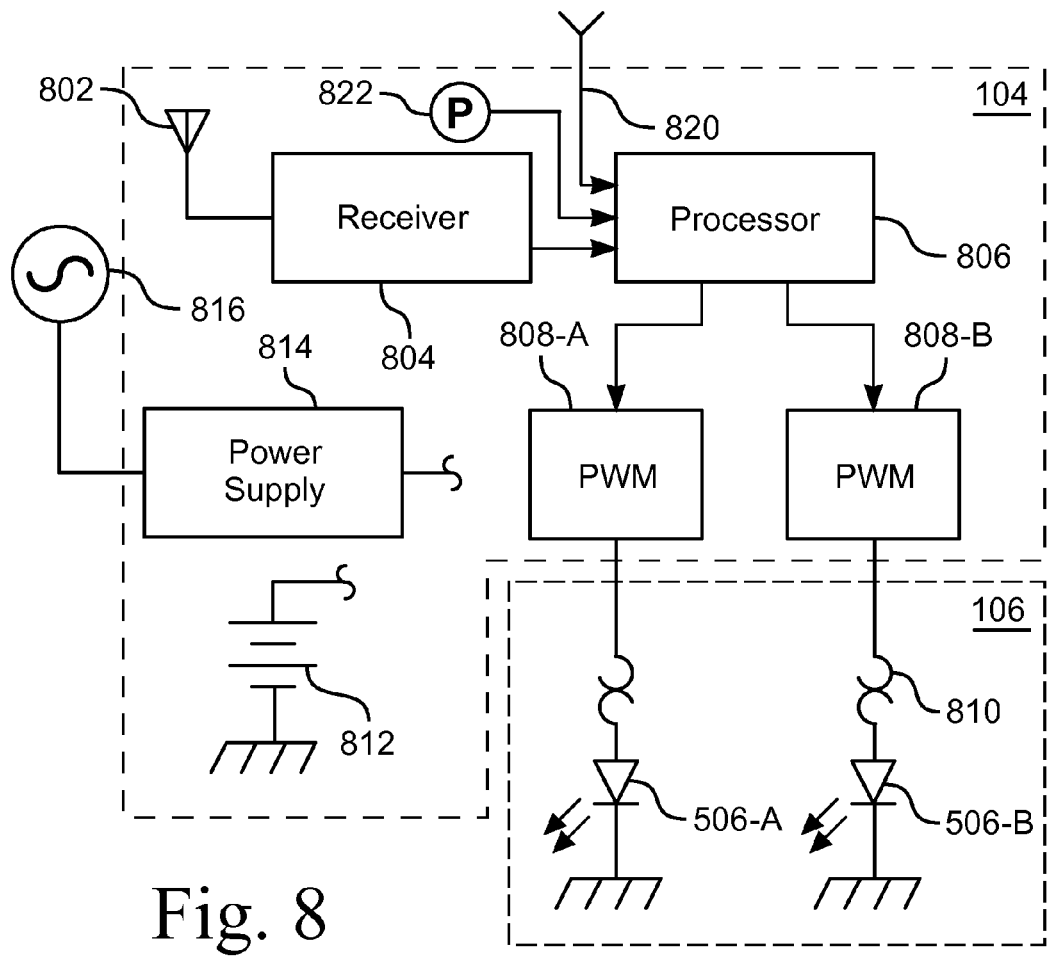
FIG. 8 is a functional block diagram of one embodiment of the luminaire.

FIG. 8 illustrates a functional block diagram of one embodiment of the luminaire 102. The luminaire 102 includes an antenna 802 connected to a receiver 804. The antenna 802 and receiver 804 are receptive to wireless signals from a remote unit 108, 110. In various embodiments the wireless signals are electromagnetic signals, such as those carried by Bluetooth, WiFi, or other radio frequency (RF) carrier. In other embodiments the wireless signals are optical signals, such as an infrared signal, with the antenna 802 being a sensor sensitive to the optical signal. The receiver 804 provides data to the processor 806 corresponding to the data sent by the remote unit 108, 110. For the embodiment in which the luminaire 102 is hardwired to a remote unit 110, an input/output (I/O) connection 820 is provided for such direct connection. The input/output connection 820 is connected to the I/O portion of the processor 806. In another embodiment a photo sensor 822 is connected to the processor 806. The photo sensor 822, in various embodiments, is responsive to various characteristics of ambient and/or reflected light from the object 116.

As used herein, the processor 806 should be broadly construed to mean any computer or component thereof that executes software. In one embodiment the processor 806 is a general purpose computer, in another embodiment, it is a specialized device for implementing the functions of the invention. The processor 806 includes a memory medium that stores software, a processing unit that executes the software, and input/output (I/O) units for communicating with external devices.

Those skilled in the art will recognize that the processor 806 includes an input component, an output component, a storage component, and a processing component. The input component receives input from external devices through the input component, such as the receiver 804, the input connection 820, and the sensor 822. The output component sends output to external devices, such as the PWM devices 808-A, 808-B. The storage component stores data and program code. In one embodiment, the storage component includes random access memory. In another embodiment, the storage component includes non-volatile memory. Those skilled in the art will recognize that the memory medium associated with the processor 806 can be either internal or external to the processing unit of the processor 806 without departing from the scope and spirit of the present invention. The processing component executes the instructions included in the software and routines.

The processor 806 acts upon the inputs from the receiver 804 and the other inputs 820, 822. The processor 806 provides outputs to a pair of pulse width modulation (PWM) devices 808-A, 808-B and an indicator lamp, if one is provided to indicate that the luminaire 102 is being actively controlled by a remote unit 108, 110. Each PWM device 808-A, 808-B has an output connected to a thermal fuse 810 and a light source 506-A, 506-B. The PWM devices 808-A, 808-B repeatedly turn on the light sources 506-A, 506-B at a specific frequency and voltage. The PWM devices 808-A, 808-B are circuits that output signals in which the duty cycle, frequency, and voltage are determined from signals received from the processor 806. The duty cycle is defined as the ratio of the light source 504 on time versus off time. The frequency is defined as the number of on cycles per second and is independent of the duty cycle. In one embodiment the voltage output is controlled or determined by the duty cycle. For example, for a light source 506 that is energized for 1 millisecond every 5 milliseconds, the duty cycle is 20% and the frequency is 200 Hertz or cycles per second. In one prototype the frequency varied between 300 Hz and 1400 Hz with a varying duty cycle of 10% to 100%. In one embodiment the output of the PWMs 808 are a modified sine wave, such as would be produced with a filter on the output of the PWM 808.

The thermal fuse 810 is a series connected device that opens the circuit when the sensed temperature is reached. In various embodiments the thermal fuse 810 setpoint is between 120 to 140 degrees Fahrenheit. The thermal fuse 810 senses the temperature near the light sources 506, such as adjacent the mounting plate 502 or the end of the heat sink 402 in the stalk 304. In another embodiment one or both of the thermal fuses 810 are not used and the light sources 506 are connected directly to the PWM devices 808. In yet another embodiment the thermal fuses 810 are replaced with one or more temperature sensing devices that provide an input to the processor 806 for control of power to the light sources 506 to prevent overheating conditions.

In the illustrated embodiment the light sources 506 are light emitting diodes (LEDs) 506-A, 506-B. One LED 506-A has a cool temperature color that varies based on voltage, for example, it has a color temperature of 6700 K at a high voltage and 5800 K at a low voltage. The other LED 506-B has a warm temperature color that varies based on voltage, for example, it has a color temperature of 5900 K at a high voltage and 4300 K at a low voltage. In another embodiment the light sources 506 are all of the same type with a color temperature that varies between desired cool and warm values. In one embodiment the LEDs 506 are overdriven, for example, they are operated at a voltage of 1.6 V when their specification calls for 1.1 V.

Depending upon the environment and the specifications of the light sources 506, one or more LEDs 506 are used to ensure proper intensity and illumination coverage. In one embodiment six one-watt LEDs 506 are used to provide an emitted output of 800 lumens of light. This includes three cool LEDs 506-A and three warm LEDs 506-B. The lens elements 602 focus the emitted light in order to cover the illuminated object 116 thereby increasing the apparent emitted intensity.

In one embodiment the luminaire 102 is powered by a battery or battery pack 812 that provides power to the various components. For example, in one embodiment the battery 812 has a lithium chemistry and sufficient capacity to provide illumination for one year or about 400 operating hours. For the embodiment where the luminaire 102 is hardwired, an external source 816 is connected to a power supply 814 that provides power to the various components. The external source 816 allows for satisfying the power requirements for the embodiment with the photo sensor 822 that enables the automatic color temperature adjustment.

Figure 9:
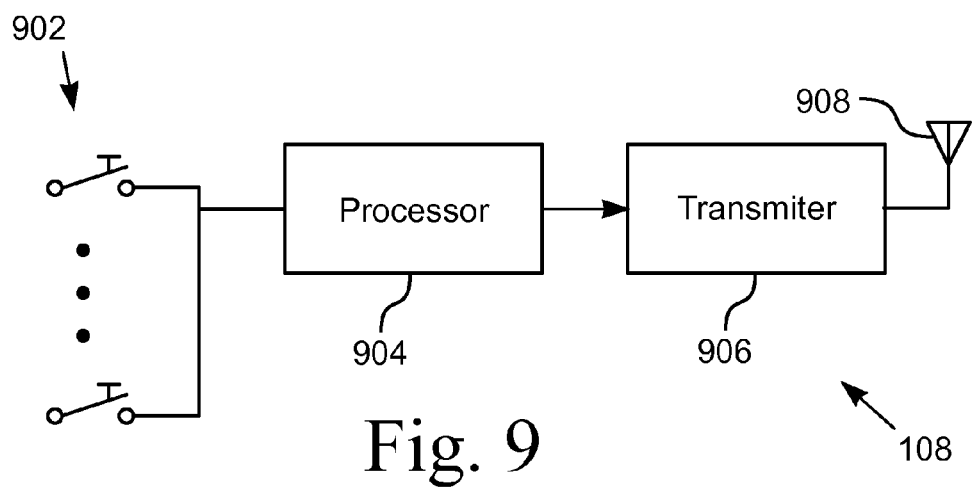
FIG. 9 is a functional block diagram of one embodiment of the remote control unit.

FIG. 9 illustrates a functional block diagram of one embodiment of the remote control unit 108. A plurality of switches 902 are connected to a remote processor 904, which is in turn connected to a transmitter 906 having an antenna 908. The switches 902 correspond to the operator controls 202, 204, 206, 208, 210 on the remote unit 108. For example, in one embodiment the color temperature control 202 has a rocker-type operator that controls two switches 902. The remote processor 904 detects the switch 902 when it is operated and causes the transmitter 906 to send a corresponding signal to the luminaire 102.

In one embodiment of the remote unit 110 the transmitter 906 and antenna 908 illustrated in FIG. 9 are replaced with an input/output device and wiring that connects to the luminaire 102, either directly or through a network or other signal sharing system. In one such embodiment of the remote unit 110 the remote processor 904 receives inputs from the switches 902 and the luminaire 102, thereby allowing a status to be displayed on the unit 110.

In one embodiment the time controls 210 are used to select one of multiple luminaires 102 to receive for control by the remote unit 108. For example, one of the switches 902 corresponding to a particular time control 210 is held in the actuated position for a longer time than needed to select the time duration. The processor 904 interprets the long keypress as a control to select the corresponding luminaire 102. The processor 904 then outputs an appropriate signal that identifies the corresponding luminaire 102, which then acts on any further actuations of the switches 702 until another luminaire 102 is selected from the remote unit 108.

Figure 10:
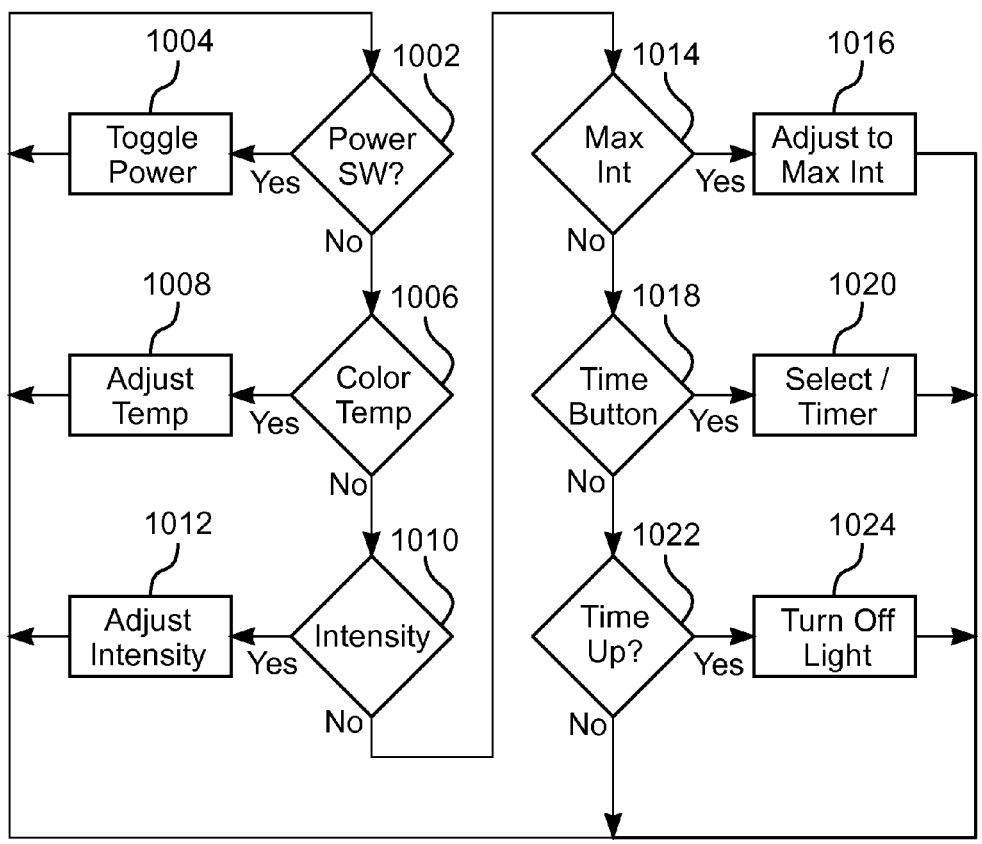
FIG. 10 is a flow chart showing one embodiment of the steps for controlling the luminaire.

FIG. 10 illustrates a flow chart showing one embodiment of the steps for controlling the luminaire 102. The flow chart shows a loop in which monitored data points cause an action when triggered. The illustrated loop starts with the step 1002 of monitoring for a press of the power control 206 on the remote unit 108. If the power control 206 is operated then the step 1004 of toggling the power is performed. The step 1004 of toggling power includes turning off the light source 506 if it is on and turning on the light source 506 if it is off. In one embodiment the processor 806 stores the power status of the luminaire 102 and the light sources 506. In one embodiment the step 1004 of toggling power includes placing the processor 808 in a low power or idle mode and placing the receiver 804 in a low power mode if the action is to turn off power. In one embodiment, the light source 506 is turned on by the operation of any control on the remote unit 108, 110.

The next step 1006 is monitoring for a press of the color temperature control 202. If the color temperature control 202 is operated then the step 1008 of adjusting the color temperature is performed. In the embodiment illustrated in FIG. 8 operating the color temperature control 202 to make the color temperature cooler causes the processor 806 to instruct the cool PWM device 808-A to increase the duty cycle, thereby raising the applied voltage to the cool LED 506-A and causing the cool LED 506-A to emit an increased (cooler) color temperature. In one such embodiment the processor 806 also instructs the PWM device 808-B to increase the duty cycle, thereby causing the warm LED 506-A to emit a higher (cooler) color temperature.

A characteristic of some LEDs 506 is that the intensity may also change with varying voltage levels. For example, as the applied voltage increases, the lumen output of the LED increases. For those cases where the intensity of the light source 506 varies with the applied voltage, the processor 806 controls the PWM devices 808-A, 808-B to adjust the frequency or intensity level of each of the light sources 506-A, 506-B in order to maintain an average intensity level as the color temperature changes. For example, the processor 806 instructs the cool PWM device 808-A to increase frequency, causing the cool LED 506-A to increase intensity, while instructing the warm PWM device 808-B to decrease frequency, causing the warm LED 506-B to decrease intensity, thereby maintaining the same overall intensity or brightness while raising the color temperature. If the color temperature control 202 is operated to make the temperature warmer, the operation is similar but opposite.

The next step 1010 is monitoring for a press of the brightness or intensity control 204. If the intensity control 204 is operated then the step 1012 of adjusting the intensity is performed. In the embodiment illustrated in FIG. 8 operating the intensity control 204 to make the intensity brighter causes the processor 806 to instruct the PWM devices 808-A, 808-B to increase frequency, thereby increasing the frequency to the LEDs 506-A, 506-B and causing the LEDs 506-A, 506-B to emit with greater intensity. Operating the intensity control 204 to make the intensity dimmer causes the processor 806 to instruct the PWM devices 808-A, 808-B to decrease frequency, thereby decreasing the frequency to the LEDs 506-A, 506-B and causing the LEDs 506-A, 506-B to emit with less intensity. If the cool and warm LEDs 506-A, 506-B have been adjusted to differing intensity levels by operation of the color temperature control 202, then once one of the cool or warm LEDs 506-A, 506-B is adjusted to its extreme value, either a maximum or minimum, no further intensity adjustment is made to the LEDs 506-A, 506-B.

The next step 1014 is monitoring for a press of the maximum intensity control 208. If the maximum intensity control 208 is operated then the step 1016 of adjusting to a maximum intensity is performed. In the embodiment illustrated in FIG. 8 operating the maximum intensity control 208 causes the LED 506-A, 506-B currently set with the greatest intensity to increase to maximum intensity by increasing the frequency of the associated PWM device 808-A, 808-B. The other LED 506-A, 506-B, which is set at a lower intensity, has its intensity increased so as to maintain the same emitted color intensity. This is accomplished by increasing the frequency of the other associated PWM device 808-A, 808-B by a similar amount as the other was increased.

The next step 1018 is monitoring for a press of one of the time controls 210. If one of the time controls 210 is operated then the step 1020 of selecting the luminaire 102 or setting the timer is performed. If the time control 210 is operated with a short press, then the processor 806 in the luminaire 102 sets a count-down timer to the selected time duration. If the time control 210 is operated with a long press, then the processor 806 in the luminaire 102 determines if the received signal selects that luminaire 102 to respond to any further signals received from the remote unit 108. That is, if the received signal indicates that the luminaire 102 is selected, the luminaire 102 responds to any following signal received from the remote unit 108. If the received signal indicates that the luminaire 102 is not selected, the luminaire 102 ignores any following signal received from the remote unit 108 until a signal is received indicating that the luminaire 102 is selected.

The next step 1022 is monitoring for expiration of the count-down timer. In various embodiments either the processor 806 or a separate timer device performs the count-down timing function. When the power control 206 is operated to turn on the luminaire 102, the count-down timer is set to a default value, for example, one hour. If one of the time controls 210 is operated then the count-down timer is reset to the selected value. When the set time expires, the step 1024 to turn off the illumination is performed. This step 1024 includes the processor 806 turning off the LEDs 506-A, 506-B.

In one embodiment the luminaire 102 has an automatic color temperature adjustment feature. For the embodiment with the photo sensor 822, automatic color temperature adjustment is provided. That is, the photo sensor 822 measures the ambient light and adjusts the intensity and/or the color temperature of the light source 506 based on the current ambient conditions. In such an embodiment the steps 1006 and/or 1010 are based on the output of the photo sensor 822.

In one such embodiment the sensor 822 is a camera or image-type sensor, for example, a CCD image sensor or a CMOS sensor. The sensor 822 is mounted on the light assembly 502 such that the object 116 is in its field of view. Upon energization of the luminaire 102 or initiation of the light cycle, the processor 806 determines the color temperature and intensity monitored by the sensor 822. This is the initial ambient condition. The light source 506 illuminates the object 116 and the luminaire 102 is adjusted to illuminate the object 116 at a desired color temperature and intensity, which is the desired illuminated condition. The sensor 822 measures the illuminated color temperature and intensity to determine the current illuminated condition. The difference between the initial ambient condition and the illuminated condition is the contribution by the luminaire 102.

In many environments the ambient condition changes through the course of the day. For example, windows allow outside light to enter and the ambient condition will vary depending upon the time of day and outside weather conditions. In other cases the lights in a room or zone are changed for whatever reason, perhaps to illustrate an artistic effect. As the ambient condition changes, the processor 806 determines the difference between the current illuminated condition and the desired illuminated condition in order to adjust the output of the light source 506 to keep the current illuminated condition and the desired illuminated condition within certain limits. That is, the color temperature and intensity output by the luminaire 102 is controlled by the processor 806 to maintain the current illuminated condition constant with changing ambient conditions. In one embodiment the processor 806 uses differential control to maintain the constant illuminated condition.

In another embodiment the sensor 822 measures the temperature of the light reflected from the illuminated object 116. The emitted color temperature from the luminaire 102 is adjusted to maintain a specified value under varying ambient conditions. In another such embodiment the emitted color temperature from the luminaire 102 is adjusted to maintain a white balance. For example, for the embodiment where the photo sensor 822 is responsive to the intensity reflected from the object 116, the luminaire 102 changes the intensity 1012 of the light source 506 as the ambient light intensity changes. For the embodiment where the photo sensor 822 is responsive to the color temperature reflected from the object 116, the luminaire 102 adjusts the color temperature 1008 of the light source 506 as the ambient color intensity changes, such as when the object 116 is exposed to increasingly warm light such as from the setting sun. By automatically adjusting the intensity and/or color temperature based on the ambient environment, the object 116 is illuminated appropriately for the environment.

Figure 11:
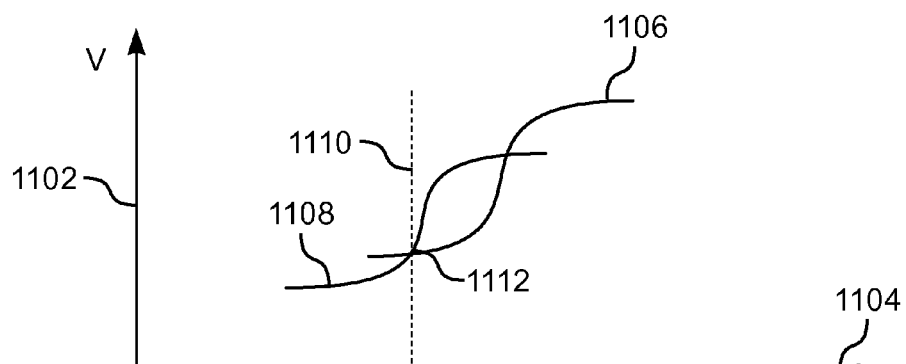
FIG. 11 is a chart showing the voltage to color temperature relationship of the light emitting diodes (LEDs).

FIG. 11 illustrates a chart showing the voltage V 1102 to color temperature T 1104 relationship of the light emitting diodes (LEDs) 506-A, 506-B. The Y-axis 1102 is the voltage level V and the X-axis 1104 is color temperature T going from low to high, left to right. One curve 1106 corresponds to the voltage to color temperature response for the cool LED 506-A and the other curve 1108 corresponds to the voltage to color temperature response for the warm LED 506-B. Both sets of LEDs 506-A, 506-B have an increasing color temperature T 1104 for an increasing voltage V 1102. For example, the cool LED 506-A varies from 4300 K to 5900 K between a low and a high voltage and the warm LED 506-B varies from 5800 K to 6700 K between a low and a high voltage. The two curves 1106, 1108 have a crossing point 1110 where the color temperature 1110 is the same when the same voltage 1102 is applied to the two LEDs 506-A, 506-B. Because the voltage to each LED 506-A, 506-B is independently controlled, the voltage 1104 does not need to be the same for each LED 506-A, 506-B. The graph of FIG. 11 shows that each LED 506-A, 506-B, when independently controlled, has a color temperature that can complement the other LED 506-A, 506-B. The color temperature of each LED 506-A, 506-B produces a combined color temperature of the illuminating light projected by the luminaire 102.

In one embodiment the voltage V 1102 and frequency applied to the LEDs 506-A, 506-B are controlled independently to produce a light output with a desired color temperature and intensity. For example, when a warm color temperature is desired the warm LED 506-B is energized and the cool LED 506-A is deenergized. The warm LED 506-B provides all the desired illumination for the object 116. When a cool color temperature is desired the cool LED 506-A is energized and the warm LED 506-B is deenergized. In this way the LEDs 506-A, 506-B are operated individually in the temperature range where the two LEDs 506-A, 506-B do not overlap. Where the temperature curves 1108, 1106 both LEDs 506-A, 506-B are energized with their intensity level set for the desired intensity. By using multiple LEDs with slightly overlapping color temperature ranges, a luminaire 102 with a desired color temperature range is achievable.

The accent lighting system 100 includes various functions. The function of selecting a color temperature for illuminating is implemented, in one embodiment, by controlling the operating parameters of the light sources 506. In one such embodiment the processor 806 and PWMs 808 control the frequency and duty cycle applied to the light sources 506. In another embodiment of the function of selecting a color temperature for illuminating is implemented by controlling multiple sets of light emitting diodes (LEDs) 506-A, 506-B such that each set emits light at a specific color temperature and intensity.

The function of varying the color temperature of the light source 506 is implemented, in one embodiment, by varying the voltage applied to the light source 506. In one such embodiment the voltage is varied by changing the duty cycle of power applied to the light source 506.

The function of varying the intensity of the light source 506 is implemented, in one embodiment, by varying the frequency of the power applied to the light source 506.

The function of preventing damage from a high temperature condition is implemented, in one embodiment, by a thermal fuse 810 inline with the light source 506 whereby the thermal fuse 810 interrupts the current to the light source 810 when the sensed temperature exceeds a set value. In another embodiment a thermal sensor provides an input to the processor 806, which shuts down the light source 506 if a high temperature is detected.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for illuminating an object with light of a specified intensity and a specified color temperature, said apparatus comprising:

a luminaire configured for mounting proximate the object to be illuminated, said luminaire having a processor, a pulse width modulator, and a light source, said pulse width modulator controlled by said processor, said pulse width modulator driving said light source, said light source includes at least one light emitting diode, said light source having a color temperature that is variable and said light source having an intensity that is variable, said luminaire including a member extending from a body, said light source proximate a distal end of said member, said distal end of said member opposite a connection end, said connection end attached to said body with a joint that is articulated; and a remote unit in communication with said luminaire, said remote unit having a color temperature control and an intensity control, manual operation of said color temperature control causing said processor to control said pulse width modulator such that said color temperature of said light source corresponds to a color temperature value selected by said color temperature control, and manual operation of said intensity control causing said processor to control said pulse width modulator such that said intensity of said light source corresponds to an intensity value selected by said intensity control.

2. The apparatus of claim 1 further including a battery providing power for said processor, said pulse width modulator, and said light source in said luminaire.

3. The apparatus of claim 1 wherein said light source includes a first light emitting diode and a second light emitting diode, said pulse width modulator independently controlling each one of said first light emitting diode and said second light emitting diode, said first light emitting diode having a warm color temperature output and said second light emitting diode having a cool color temperature output.

4. The apparatus of claim 1 wherein said member having a hollow portion; and further including a heat sink disposed in said hollow portion such that heat from said light source is conducted through said hollow portion, said heat sink extending substantially the distance between said light source and said connection end.

5. The apparatus of claim 1 wherein said color temperature of said light source varies in response to changes in a voltage applied to said light source, said voltage controlled by said processor.

6. The apparatus of claim 1 wherein said intensity of said light source varies in response to changes in a frequency applied to said light source, said frequency controlled by said processor.

7. The apparatus of claim 1 wherein said remote unit further includes at least one time control, manual operation of said time control causing said processor to illuminate said light source for a selected time.

8. The apparatus of claim 1 wherein said remote unit is in wireless communication with said luminaire.

9. An apparatus for illuminating an object with light of a specified intensity and a specified color temperature, said apparatus comprising:
  a luminaire configured for mounting proximate the object to be illuminated, said luminaire having a processor, a pulse width modulator, and a light source, said pulse width modulator controlled by said processor, said pulse width modulator driving said light source, said light source includes at least one light emitting diode, said light source having a color temperature that is variable and said light source having an intensity that is variable, said luminaire including a member extending from a body, said light source proximate a distal end of said member, said distal end of said member opposite a connection to said body, said member having a heat sink disposed in a hollow portion of said member, said heat sink extending substantially the distance between said light source and a connection end that is opposite said distal end of said member; and
  a remote unit in communication with said luminaire, said remote unit having a color temperature control and an intensity control, manual operation of said color temperature control causing said processor to control said pulse width modulator such that said color temperature of said light source corresponds to a color temperature value selected by said color temperature control, and manual operation of said intensity control causing said processor to control said pulse width modulator such that said intensity of said light source corresponds to an intensity value selected by said intensity control.

10. The apparatus of claim 9 further including a battery providing power for said processor, said pulse width modulator, and said light source in said luminaire.

11. The apparatus of claim 9 wherein said light source includes a first light emitting diode and a second light emitting diode, said pulse width modulator independently controlling each one of said first light emitting diode and said second light emitting diode, said first light emitting diode having a warm color temperature output and said second light emitting diode having a cool color temperature output.

12. The apparatus of claim 9 wherein said connection end is attached to said body with a joint that is articulated.

13. The apparatus of claim 9 wherein said color temperature of said light source varies in response to changes in a voltage applied to said light source, said voltage controlled by said processor.

14. The apparatus of claim 9 wherein said intensity of said light source varies in response to changes in a frequency applied to said light source, said frequency controlled by said processor.

15. An apparatus for illuminating an object with light of a specified intensity and a specified color temperature, said apparatus comprising:
  a luminaire configured for mounting proximate the object to be illuminated, said luminaire having a processor, a pulse width modulator, and a light source, said pulse width modulator controlled by said processor, said pulse width modulator driving said light source, said light source includes at least one light emitting diode, said light source having a color temperature that is variable and said light source having an intensity that is variable, said luminaire including a member extending from a body, said light source proximate a distal end of said member, said distal end of said member opposite a connection end, said connection end attached to said body with a joint that is articulated, said color temperature of said light source varying in response to changes in a voltage applied to said light source, said voltage controlled by said processor; and
  a remote unit in communication with said luminaire, said remote unit having a color temperature control and an intensity control, manual operation of said color temperature control causing said processor to control said pulse width modulator such that said color temperature of said light source corresponds to a color temperature value selected by said color temperature control, and manual operation of said intensity control causing said processor to control said pulse width modulator such that said intensity of said light source corresponds to an intensity value selected by said intensity control.

16. The apparatus of claim 15 further including a battery providing power for said processor, said pulse width modulator, and said light source in said luminaire.

17. The apparatus of claim 15 wherein said light source includes a first light emitting diode and a second light emitting diode, said pulse width modulator independently controlling each one of said first light emitting diode and said second light emitting diode, said first light emitting diode having a warm color temperature output and said second light emitting diode having a cool color temperature output.

18. The apparatus of claim 15 wherein said light source is in a member that extends from a body of said luminaire, said member having a hollow portion; and further including a heat sink disposed in said hollow portion such that heat from said light source is conducted through said hollow portion.

19. The apparatus of claim 15 wherein said intensity of said light source varies in response to changes in a frequency applied to said light source, said frequency controlled by said processor.

20. The apparatus of claim 15 wherein said remote unit further includes at least one time control, manual operation of said time control causing said processor to illuminate said light source for a selected time.

* * * * *